(12) United States Patent
Li et al.

(10) Patent No.: US 11,500,954 B2
(45) Date of Patent: Nov. 15, 2022

(54) LEARNING-TO-RANK METHOD BASED ON REINFORCEMENT LEARNING AND SERVER

(71) Applicant: Huawei Technologies Co., Ltd., Shenzhen (CN)

(72) Inventors: Weiguo Li, Shenzhen (CN); Xin Jiang, Hong Kong (CN); Hang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 407 days.

(21) Appl. No.: 16/538,174

(22) Filed: Aug. 12, 2019

(65) Prior Publication Data

US 2019/0370304 A1    Dec. 5, 2019

Related U.S. Application Data

(63) Continuation of application No. PCT/CN2017/111319, filed on Nov. 16, 2017.

(30) Foreign Application Priority Data

Feb. 28, 2017    (CN) .......................... 201710114414.0

(51) Int. Cl.
*G06F 16/9538*    (2019.01)
*G06N 20/00*    (2019.01)

(52) U.S. Cl.
CPC ......... *G06F 16/9538* (2019.01); *G06N 20/00* (2019.01)

(58) Field of Classification Search
None
See application file for complete search history.

(56) References Cited

U.S. PATENT DOCUMENTS

2009/0024607 A1    1/2009    Sun et al.
2012/0130994 A1    5/2012    Risvik et al.
(Continued)

FOREIGN PATENT DOCUMENTS

CN    102768679 A    11/2012
CN    102779193 A    11/2012
(Continued)

OTHER PUBLICATIONS

Sheng, F., "Dialogue Model Study and Development in Chat Bot System," Master Thesis of Beijing University of Posts and Telecommunications, related pp. 21-24, 39-51, with the translation of the related parts, 77 pages.

(Continued)

*Primary Examiner* — Amresh Singh
(74) *Attorney, Agent, or Firm* — Conley Rose, P.C.

(57) ABSTRACT

A learning-to-rank method based on reinforcement learning, including obtaining, by a server, a historical search word, and obtaining M documents corresponding to the historical search word; ranking, by the server, the M documents to obtain a target document ranking list; obtaining, by the server, a ranking effect evaluation value of the target document ranking list; using, by the server, the historical search word, the M documents, the target document ranking list, and the ranking effect evaluation value as a training sample, and adding the training sample into a training sample set.

18 Claims, 7 Drawing Sheets

(56) References Cited

U.S. PATENT DOCUMENTS

| | | | | |
|---|---|---|---|---|
| 2013/0246383 | A1* | 9/2013 | White | G06F 16/9535 |
| | | | | 707/706 |
| 2014/0297476 | A1 | 10/2014 | Wang et al. | |
| 2018/0052664 | A1* | 2/2018 | Zhang | G06F 16/90332 |
| 2018/0189282 | A1* | 7/2018 | Hartlaub | G06F 16/437 |

FOREIGN PATENT DOCUMENTS

| | | |
|---|---|---|
| CN | 103020164 A | 4/2013 |
| CN | 104077306 A | 10/2014 |
| CN | 104750819 A | 7/2015 |
| CN | 105224959 A | 1/2016 |
| CN | 105893523 A | 8/2016 |

OTHER PUBLICATIONS

Xue, K et al.,"Research on Listwise Approaches of Learning to Rank Based on Position Discount", Journal of Chinese Computer Systems, vol. 38, No. 1, Jan. 2017, with the translation, total 12 pages.

Machine Translation and Abstract of Chinese Publication No. CN102768679, Nov. 7, 2012, 26 pages.

Machine Translation and Abstract of Chinese Publication No. CN102779193, Nov. 14, 2012, 24 pages.

Machine Translation and Abstract of Chinese Publication No. CN103020164, Apr. 3, 2013, 11 pages.

Machine Translation and Abstract of Chinese Publication No. CN104750819, Jul. 1, 2015, 21 pages.

Burges, C., "From ranknet to lambdarank to lambdamart: An overview," Jan. 2010, 20 pages.

Williams, R., "Simple Statistical Gradient-Following Algorithms for Connectionist Reinforcement Learning," Machine learning, 8(3-4), 1992, pp. 229-256.

Foreign Communication From A Counterpart Application, PCT Application No. PCT/CN2017/111319, English Translation of International Search Report dated Feb. 23, 2018, 2 pages.

Foreign Communication From A Counterpart Application, PCT Application No. PCT/CN2017/111319, English Translation of Written Opinion dated Feb. 23, 2018, 4 pages.

\* cited by examiner

LEARNING-TO-RANK METHOD BASED ON REINFORCEMENT LEARNING AND SERVER

CROSS-REFERENCE TO RELATED APPLICATIONS

This application is a continuation of International Patent Application No. PCT/CN2017/111319 filed on Nov. 16, 2017, which claims priority to Chinese Patent Application No. 201710114414.0 filed on Feb. 28, 2017. The disclosures of the aforementioned applications are hereby incorporated by reference in their entireties.

TECHNICAL FIELD

The present disclosure relates to the learning-to-rank field, and in particular, to a learning-to-rank method based on reinforcement learning and a server.

BACKGROUND

With rapid development of the Internet, information experiences an explosive growth. How to quickly find user-required data from massive information has become a research focus in information retrieval. Currently, a search engine is mainly used to retrieve and find required data from massive information and rank search results.

However, with development of servers, more factors affect ranking of the search results, and consequently a ranking model cannot be obtained through manual fitting. In this case, machine learning is very appropriate. A learning-to-rank algorithm is a very important machine learning algorithm currently.

The learning-to-rank algorithm is a ranking algorithm based on supervised learning, and has been widely applied to a search scenario, a question-and-answer scenario, a recommendation scenario, and the like. An existing ranking algorithm mainly includes a pointwise algorithm, a pairwise algorithm, and a listwise algorithm. The pointwise algorithm is used to convert a ranking problem into a regression problem. For each "search word-document pair", a ranking model is learned to fit a score of the "search word-document" and a correlation annotation. The pairwise algorithm is used to convert a ranking problem into a classification problem. For each "search word", a ranking model is learned to distinguish correlations (determined by annotations) between the "search word" and different "candidate documents". The listwise algorithm is expected to be used to obtain an optimal overall ranking effect for each "search word" by learning a ranking model.

An existing model based on the learning-to-rank algorithm needs to depend on annotation data of a correlation between a search word and a document for training, but cannot use data obtained by a user by evaluating a ranking effect of a document ranking list corresponding to the search word. As a result, user satisfaction with the ranking effect cannot be improved.

SUMMARY

Embodiments of the present disclosure provide a learning-to-rank method based on reinforcement learning and a server, to help to improve user satisfaction with a ranking result of a document ranking list corresponding to a search word.

According to a first aspect, an embodiment of the present disclosure provides a learning-to-rank method based on reinforcement learning, including receiving, by a server, a search word entered by a user; obtaining, by the server, N documents matching the search word, wherein N is a natural number; ranking, by the server, the N documents by using a ranking model to obtain a document ranking list, wherein the ranking model is obtained through training based on a reinforcement learning algorithm, a historical search word, one or more historical documents corresponding to the historical search word, and a document ranking list and a ranking effect evaluation value that are corresponding to the historical search word; and displaying, by the server, the document ranking list to the user.

Compared with other approaches, in this embodiment, the ranking model is continuously trained by using the reinforcement learning algorithm, to improve a ranking effect of the document ranking list obtained by using the ranking model, thereby improving user satisfaction with the ranking effect.

In a feasible embodiment, before the ranking, by the server, the N documents by using a ranking model to obtain a document ranking list, the method includes obtaining, by the server, the historical search word, and obtaining M documents corresponding to the historical search word; ranking, by the server, the M documents to obtain a target document ranking list; obtaining, by the server, a ranking effect evaluation value of the target document ranking list; using, by the server, the historical search word, the M documents, the target document ranking list, and the ranking effect evaluation value as a training sample, and adding the training sample into a training sample set; and when a quantity of training samples in the training sample set is greater than a preset quantity, training, by the server, the training sample set by using the reinforcement learning algorithm, to obtain the ranking model.

Compared with other approaches, in this embodiment, the historical search word, the M documents, the target document ranking list, and the ranking effect evaluation value are used as a training sample in the training sample set, and a parameter θ is continuously optimized by using the training sample set and the reinforcement learning algorithm, so that a value of an expected function increases continuously to accurately optimize a ranking indicator. This helps to improve user satisfaction with a ranking result of the document ranking list corresponding to the search word.

In a feasible embodiment, the ranking, by the server, the M documents based on a ranking model to obtain a target document ranking list includes scoring, by the server, a correlation between each of the M documents and the historical search word based on the ranking model to obtain a scoring result; and ranking, by the server, the M documents in ascending order or descending order of the scoring results to obtain the target document ranking list.

In a feasible embodiment, the obtaining, by the server, a ranking effect evaluation value of the target document ranking list includes evaluating, by the server, a ranking effect of the target document ranking list based on a user behavior, and obtaining the ranking effect evaluation value.

In a feasible embodiment, the obtaining, by the server, a ranking effect evaluation value of the target document ranking list further includes using, by the server as the ranking effect evaluation value, a value provided by the user after the user evaluates a ranking effect of the target document ranking list.

In a feasible embodiment, the obtaining, by the server, a ranking effect evaluation value of the target document ranking list further includes evaluating, by the server, a ranking effect of the target document ranking list based on a result provided by the user after the user scores a correlation between each document in the target document ranking list and the historical search word, to obtain the ranking effect evaluation value.

According to a second aspect, an embodiment of the present disclosure provides a server, including a receiving module configured to receive a search word entered by a user; a first obtaining module configured to obtain N documents matching the search word, where N is a natural number; a first ranking module configured to rank the N documents by using a ranking model to obtain a document ranking list, where the ranking model is obtained through training based on a reinforcement learning algorithm, a historical search word, a historical document corresponding to the historical search word, and a document ranking list and a ranking effect evaluation value that are corresponding to the historical search word; and a display module configured to display the document ranking list to the user.

In a feasible embodiment, before the first ranking module ranks the N documents by using the ranking model to obtain the document ranking list, the server further includes a second obtaining module configured to obtain the historical search word, and obtain M documents corresponding to the historical search word; a second ranking module configured to rank the M documents to obtain a target document ranking list; a third obtaining module configured to obtain a ranking effect evaluation value of the target document ranking list; a collection module configured to use the historical search word, the M documents, the target document ranking list, and the ranking effect evaluation value as a training sample, and add the training sample into a training sample set; and a training module configured to, when a quantity of training samples in the training sample set is greater than a preset quantity, train the training sample set by using the reinforcement learning algorithm, to obtain the ranking model.

In a feasible embodiment, the second ranking module includes a scoring unit configured to score a correlation between each of the M documents and the historical search word based on the ranking model to obtain a scoring result; and a ranking unit configured to rank the M documents in ascending order or descending order of the scoring results to obtain the document ranking list.

In a feasible embodiment, the third obtaining module is specifically configured to evaluate a ranking effect of the target document ranking list based on a user behavior, and obtain the ranking effect evaluation value.

In a feasible embodiment, the third obtaining module is specifically configured to obtain a value provided by the user after the user evaluates a ranking effect of the target document ranking list, and use the value as the ranking effect evaluation value.

In a feasible embodiment, the third obtaining module is specifically configured to obtain a scoring result provided by the user after the user scores a correlation between each document in the target document ranking list and the historical search word, and evaluate a ranking effect of the target document ranking list based on the scoring result to obtain the ranking effect evaluation value.

These or other aspects of the present disclosure are more concise and comprehensible in descriptions of the following embodiments.

BRIEF DESCRIPTION OF DRAWINGS

To describe the technical solutions in the embodiments of the present disclosure more clearly, the following briefly describes the accompanying drawings. The accompanying drawings in the following description show merely some embodiments of the present disclosure, and a person of ordinary skill in the art may still derive other drawings from these accompanying drawings without creative efforts.

DESCRIPTION OF EMBODIMENTS

In the specification, claims, and accompanying drawings of the present disclosure, the terms "first", "second", "third", "fourth", and so on are intended to distinguish between different objects but do not indicate a particular order. In addition, the terms "include", "comprise", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of the present disclosure. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

The following describes the embodiments of this application with reference to the accompanying drawings.

Figure 1:
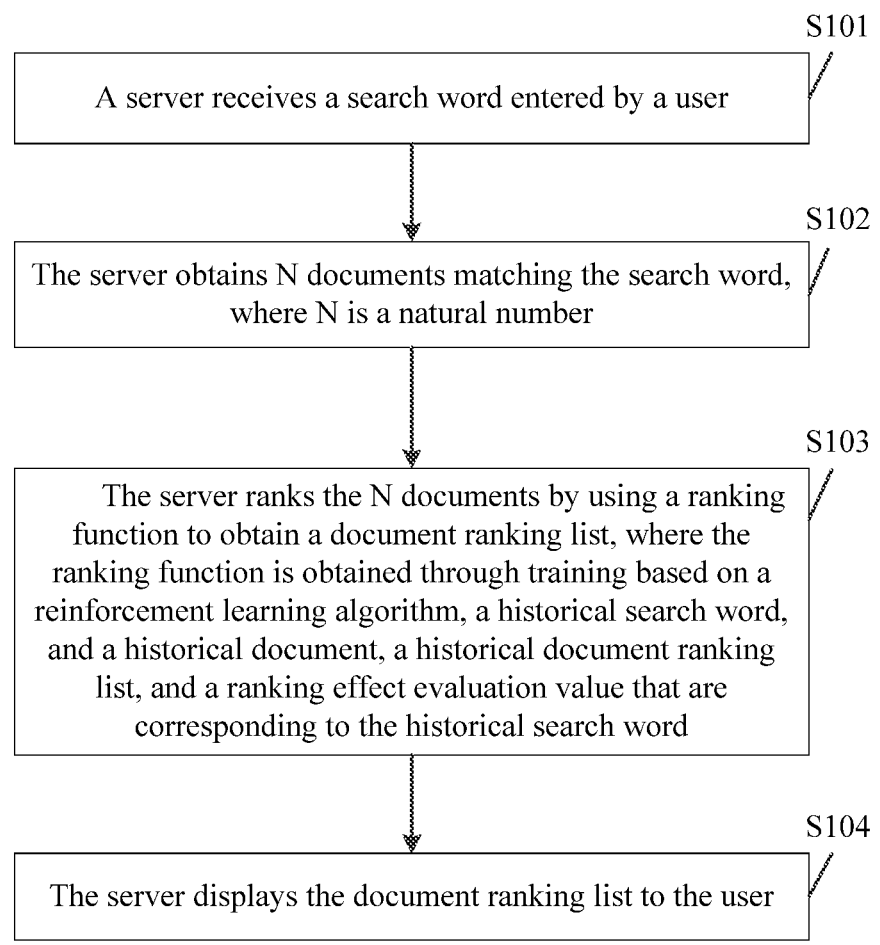
FIG. 1 is a schematic flowchart of a document search method according to an embodiment of the present disclosure.

FIG. 1 is a schematic flowchart of a document search method according to an embodiment of the present disclosure. As shown in FIG. 1, a learning-to-rank method based on reinforcement learning according to this embodiment of the present disclosure includes the following steps.

S101: A server receives a search word entered by a user.

S102: The server obtains N documents matching the search word, where N is a natural number.

After receiving the search word entered by the user, the server obtains, from a background database of the server, the N documents related to the search word. The search word is included in a title or content of any of the N documents.

S103: The server ranks the N documents by using a ranking model to obtain a document ranking list, where the ranking model is obtained through training based on a reinforcement learning algorithm, a historical search word, a historical document corresponding to the historical search word, and a document ranking list and a ranking effect evaluation value that are corresponding to the historical search word.

That the server ranks the N documents by using a ranking model to obtain a document ranking list specifically includes scoring, by the server, each of the N documents based on the ranking model, and obtaining a scoring result; and ranking, by the server, the N documents based on the scoring result to obtain the document ranking list.

Specifically, the ranking model is a differentiable function including a parameter, for example, a feedforward neural network function MLP(x).

It should be noted herein that, for a process in which the server trains the ranking model based on the reinforcement learning algorithm, the historical search word, the historical document corresponding to the historical search word, and the document ranking list and the ranking effect evaluation value that are corresponding to the historical search word, refer to related descriptions of FIG. 2 to FIG. 5.

S104: The server displays the document ranking list to the user.

Specifically, after obtaining the document ranking list, the server displays the document ranking list for query by the user.

Figure 2:
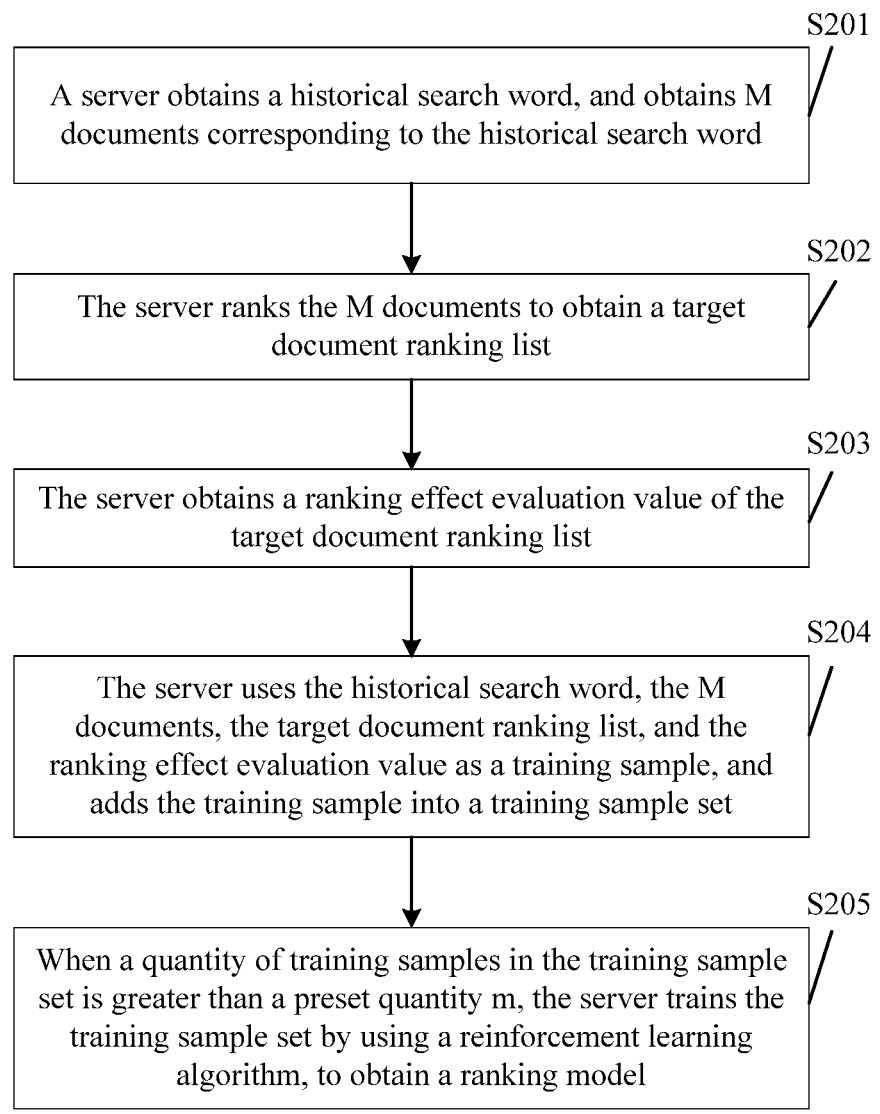
FIG. 2 is a schematic flowchart of a learning-to-rank method based on reinforcement learning according to an embodiment of the present disclosure.

FIG. 2 is a schematic flowchart of a learning-to-rank method based on reinforcement learning according to an embodiment of the present disclosure. As shown in FIG. 2, the learning-to-rank method based on reinforcement learning according to this embodiment of the present disclosure includes the following steps.

S201: A server obtains a historical search word, and obtains M documents corresponding to the historical search word.

Optionally, the historical search word may be entered by a user, or may be automatically obtained by the server.

Specifically, after receiving the historical search word q, the server obtains, from a background database of the server based on the historical search word, the M documents related to the historical search word q. The historical search word q is included in a title or content of any of the M documents.

The M documents may be represented by a set $(d_1, d_2, \ldots, d_M)$.

S202: The server ranks the M documents to obtain a target document ranking list.

Specifically, the server scores a correlation between each of the M documents and the historical search word q based on a ranking model to obtain a scoring result.

The correlation between each of the M documents and the historical search word q includes a quantity of occurrences of the historical search word q in a title or content of each of the M documents.

The server ranks the M documents in ascending order or descending order of the scoring results to obtain the document ranking list.

The ranking model is a differentiable function including a parameter, and may be represented by $f(q,d;\theta)$, where q is the historical search word, d is a document obtained based on the search word q, and $\theta$ is the parameter.

Scoring results obtained by the server by scoring occurrence frequency of the historical search word in all of the M documents based on the ranking model $f(q,d;\theta)$ may be represented by a set $(d_1', d_2', \ldots, d_M')$, and the target document ranking list obtained by the server by ranking the M documents in ascending order or descending order of the scoring results may be represented by a set $(y_1, y_2, \ldots, y_M)$.

Further, the foregoing process can be represented by $\sigma=(y_1, y_2, \ldots, y_M)=\text{sort}(d_1, d_2, \ldots, d_M)$. The sort function is a descending-order ranking model or an ascending-order ranking model.

S203: The server obtains a ranking effect evaluation value of the target document ranking list.

It should be noted herein that a larger ranking effect evaluation value r indicates a better ranking effect of the target document ranking list and higher user satisfaction with the document ranking list.

Optionally, that the server obtains a ranking effect evaluation value of the target document ranking list includes evaluating, by the server, a ranking effect of the target document ranking list based on a user behavior, and obtaining the ranking effect evaluation value.

Specifically, the evaluating, by the server, a ranking effect of the target document ranking list $(y_1, y_2, \ldots, y_M)$ based on a user behavior is specifically obtaining, by the server, a last click location k of the user in the target document ranking list $(y_1, y_2, \ldots, y_M)$, where the click location $k \in \{1, 2, \ldots, M\}$; and calculating, by the server based on an evaluation function, the ranking effect evaluation value r of the target document ranking list obtained by the server. A larger ranking effect evaluation value r indicates a better ranking effect of the target document ranking list.

Optionally, the evaluation function may be $r=1/k$, or may be a function in another form.

Optionally, that the server obtains a ranking effect evaluation value of the target document ranking list includes obtaining, by the server, a value provided by the user after the user evaluates a ranking effect of the target document ranking list, and using the value as the ranking effect evaluation value.

Specifically, the user evaluates satisfaction with a ranking result of the document ranking list $(y_1, y_2, \ldots, y_M)$ corresponding to the search word q, and provides a value. The server uses the value as the ranking effect evaluation value r.

A larger ranking effect evaluation value r indicates higher user satisfaction with the ranking result of the document ranking list $(y_1, y_2, \ldots, y_M)$ corresponding to the search word q.

Optionally, that the server obtains a ranking effect evaluation value of the target document ranking list includes evaluating, by the server, a ranking effect of the target document ranking list based on a result provided by the user after the user scores a correlation between each document in the target document ranking list and the historical search word q, to obtain the ranking effect evaluation value.

Specifically, the user scores the correlation between each document in the target document ranking list $(y_1, y_2, \ldots, y_M)$ and the historical search word q and provides the scoring result. The scoring results may be represented by a set $(g_1, g_2, \ldots, g_M)$. The scoring result $g_i$ is an $i^{th}$ value in the set $(g_1, g_2, \ldots, g_M)$, and $g_i \in (0,1,2,3)$.

The server calculates the ranking effect evaluation value r according to a preset formula:

$$r = DCG@K = \sum_{i=1}^{K} \frac{2^{g_{\sigma^-(i)}} - 1}{\log_2(i+1)},$$

where $g_{\sigma^{-}(i)}$ may be understood as the $i^{th}$ value in the set $(g_1, g_2, \ldots, g_M)$, namely, $g_i$.

It should be noted herein that a full English name of DCG is Discounted Cumulative Gain, and the DCG is an indicator for measuring a server algorithm.

DCG@K means that a DCG is calculated based on the first K results in search results, and a value of K is related to a quantity of search results focused on by the user.

For example, assuming that the server is a web page server, and the user usually focuses on ranking quality of the first 10 (in a first page) documents, K=10. Alternatively, assuming that the server is a question-answering system, and the user usually focuses on quality of a first document, K=1.

S204: The server uses the historical search word, the M documents, the target document ranking list, and the ranking effect evaluation value as a training sample, and adds the training sample into a training sample set.

The training sample may be represented by a set $(q, d_1, \ldots, d_M, \sigma, r)$, where q is the historical search word, $d_1, d_2, \ldots, d_M$ and M documents, $\sigma$ is the target document ranking list $(y_1, y_2, \ldots, y_M)$, and r is the ranking effect evaluation value.

The training sample set may be represented by a set $$\begin{pmatrix} q^{(1)}, d_1^{(1)}, \ldots, d_M^{(1)}, \sigma^{(1)}, r^{(1)} \\ \vdots \\ q^{(m)}, d_1^{(m)}, \ldots, d_M^{(m)}, \sigma^{(m)}, r^{(m)} \end{pmatrix},$$

and the training sample set includes m training samples.

Further, when a quantity of training samples in the training sample set reaches a preset quantity m, the server performs step S205.

S205: When a quantity of training samples in the training sample set is greater than a preset quantity m, the server trains the training sample set by using a reinforcement learning algorithm, to obtain a ranking model.

Specifically, that the server trains the training sample set by using a reinforcement learning algorithm, to obtain a ranking model may be considered as that the server performs training based on the training sample set and the reinforcement learning algorithm to solve a parameter $\theta'$ that maximizes a value of an expected function, and substitutes the parameter $\theta'$ for the parameter $\theta$ in the ranking model, to obtain a new ranking model. The process may be considered as a process of solving $\theta$.

Specifically, the process of solving $\theta$ is as follows.

First, if a search word-document pair $(q, d_i)$ is replaced by a characteristic variable $x_i$, the set $(d_1, d_2, \ldots, d_M)$ may be replaced by a characteristic variable set $s=(x_1, \ldots, x_M)$, the training sample set $$\begin{pmatrix} q^{(1)}, d_1^{(1)}, \ldots d_M^{(1)}, \sigma^{(1)}, r^{(1)} \\ \vdots \\ q^{(m)}, d_1^{(m)}, \ldots d_M^{(m)}, \sigma^{(m)}, r^{(m)} \end{pmatrix}$$

may be replaced by $$\begin{pmatrix} x_1^{(1)}, \ldots x_M^{(1)}, \sigma^{(1)}, r^{(1)} \\ \vdots \\ x_1^{(m)}, \ldots x_M^{(m)}, \sigma^{(m)}, r^{(m)} \end{pmatrix},$$

and the ranking model is $f(q,d_i;\theta)=f(x_i;\theta)$.

Second, $\theta$ is solved by using the expected function, where $\theta$ maximizes the value of the expected function. The expected function is $$\max_{\theta} R(\theta),$$

where $R(\theta)=\sum_{i=1}^{m} p(\sigma^{(i)}|s^{(i)};\theta)r^{(i)}$, $\sigma^{(i)}$ is a target document ranking list corresponding to a historical search word q in an $i^{th}$ sample of the training sample set, $s^{(i)}$ is M documents corresponding to the historical search word q in the $i^{th}$ sample of the training sample set, and $r^{(i)}$ is a ranking effect evaluation value in the $i^{th}$ sample of the training sample set.

A function $p(\sigma^{(i)}|s^{(i)};\theta)$ is a probability of obtaining the document ranking list $\sigma^{(i)}$ based on the M documents $s^{(i)}$, and $\theta$ is a parameter that maximizes a value of the function $p(\sigma^{(i)}|s^{(i)};\theta)$.

Specifically, a likelihood function $$p(\sigma | s; \theta) = p(\sigma | x_1, \ldots, x_M) = \prod_{r^{(i)} < r^{(j)}} p_{ij},$$

where $r^{(i)} < r^{(j)}$ indicates that a ranking effect of a $j^{th}$ target document ranking list in the training sample set is better than a ranking effect of an $i^{th}$ target document ranking list in the training sample set, and $$p_{ij} = \frac{1}{1 + \exp(-(f(x_i; \theta) - f(x_j; \theta)))}.$$

Finally, a gradient ascent method is used to solve $\theta$ that maximizes the value of the function $$\max_{\theta} R(\theta),$$

and $\theta = \theta + \alpha \nabla_{\theta} R(\theta)$.

It can be learned according to the reinforcement learning algorithm that $\nabla_{\theta} R(\theta) = E[\nabla_{\theta} \ln p(\sigma|s;\theta)r] = \sum_{i=1}^{m} \ln p(\sigma^{(i)}|s^{(i)};\theta)r^{(i)}$.

For a gradient of a log-likelihood function, $$\nabla_{\theta} \ln p(\sigma | s; \theta) = \sum_{i=1, j=1}^{m} \left( \frac{1 - S_{ij}}{2} - \frac{1}{1 + \exp(f(x_i; \theta) - f(x_j; \theta))} \right)$$

$$\left( \frac{\partial f(x_i; \theta)}{\partial \theta} - \frac{\partial f(x_j; \theta)}{\partial \theta} \right).$$

$$S_{ij} = \begin{cases} +1, & \text{if } r^{(i)} < r^{(j)} \\ 0, & \text{if } r^{(i)} = r^{(j)} \\ -1, & \text{if } r^{(i)} > r^{(j)} \end{cases},$$

where $r^{(i)} < r^{(j)}$ indicates that a ranking effect of a $j^{th}$ target document ranking list in the training sample set is better than a ranking effect of an $i^{th}$ target document ranking list in the training sample set; $r^{(i)} = r^{(j)}$ indicates that a ranking effect of a $j^{th}$ target document ranking list in the training sample set is the same as a ranking effect of an $i^{th}$ target document ranking list in the training sample set; and $r^{(i)} > r^{(j)}$ indicates that a ranking effect of an $i^{th}$ target document ranking list is better than a ranking effect of a $j^{th}$ target document ranking list in the training sample set.

It should be noted herein that the gradient ascent method is common general knowledge for a person skilled in the art, and therefore a process of using the gradient ascent method to solve θ that maximizes the value of the function $$\max_\theta R(\theta)$$

is not described herein.

Steps S201 to S205 are the process, in step S103, of training the ranking model.

It can be learned that in the solution of this embodiment of the present disclosure, the server obtains the historical search word, and obtains the M documents corresponding to the historical search word; the server ranks the M documents to obtain the target document ranking list; the server obtains the ranking effect evaluation value of the target document ranking list; the server uses the historical search word, the M documents, the target document ranking list, and the ranking effect evaluation value as a training sample, and adds the training sample into the training sample set; and when the quantity of training samples in the training sample set is greater than the preset quantity, the server trains the training sample set by using the reinforcement learning algorithm, to obtain the ranking model. The server obtains, based on the training sample set and the reinforcement learning algorithm, the parameter θ' that maximizes the value of the expected function, and substitutes the parameter θ' for the parameter θ in the ranking model. A maximum value of the expected function represents highest optimization of a ranking indicator. Compared with other approaches, in this embodiment, the historical search word, the M documents, the target document ranking list, and the ranking effect evaluation value are used as a training sample in the training sample set, and the parameter θ is continuously optimized by using the training sample set and the reinforcement learning algorithm, so that the value of the expected function increases continuously to accurately optimize the ranking indicator. This helps to improve user satisfaction with a ranking result of the target document ranking list corresponding to the search word.

Figure 3:
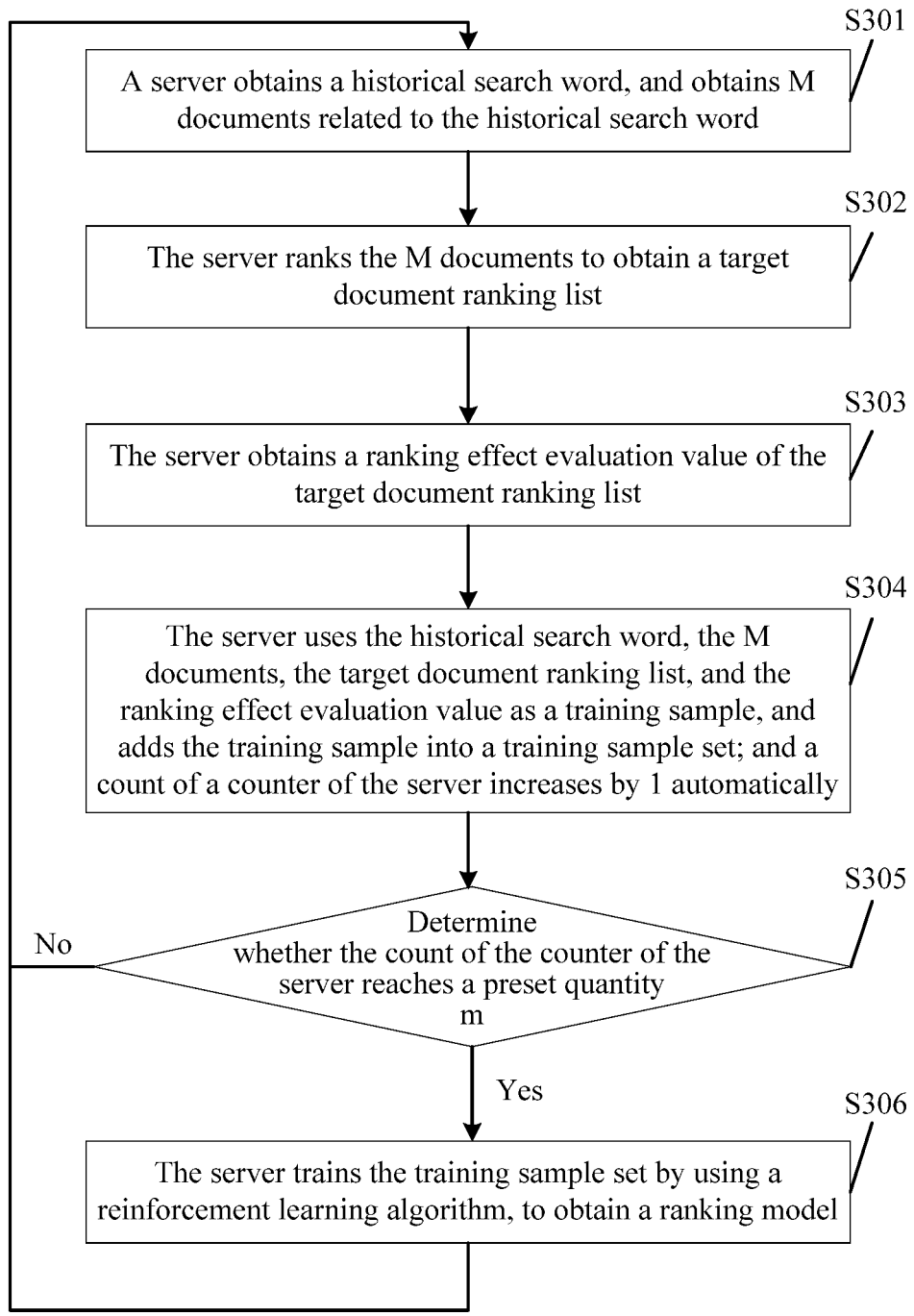
FIG. 3 is a schematic flowchart of a learning-to-rank method based on reinforcement learning according to an embodiment of the present disclosure.

FIG. 3 is a schematic flowchart of a learning-to-rank method based on reinforcement learning according to an embodiment of the present disclosure. The method includes the following steps.

S301: A server obtains a historical search word, and obtains M documents related to the historical search word.

S302: The server ranks the M documents to obtain a target document ranking list.

S303: The server obtains a ranking effect evaluation value of the target document ranking list.

It should be noted herein that for detailed descriptions of steps S301 to S303, refer to the related descriptions of steps S201 to S203, and details are not described herein again.

S304: The server uses the historical search word, the M documents, the target document ranking list, and the ranking effect evaluation value as a training sample, and adds the training sample into a training sample set; and a count of a counter of the server increases by 1 automatically.

The training sample may be represented by a set $(q, d_1, \ldots d_M, \sigma, r)$, where q is the historical search word, $d_1, d_2, \ldots,$ and $d_M$ are the M documents, σ is the target document ranking list $(y_1, y_2, \ldots, y_M)$, and r is the ranking effect evaluation value.

The training sample set may be represented by a set $$\begin{pmatrix} q^{(1)}, d_1^{(1)}, \ldots, d_M^{(1)}, \sigma^{(1)}, r^{(1)} \\ \vdots \\ q^{(m)}, d_1^{(m)}, \ldots, d_M^{(m)}, \sigma^{(m)}, r^{(m)} \end{pmatrix},$$

and the training sample set includes m training samples.

Each time the server adds one training sample into the training sample set, the count of the counter of the server increases by 1 automatically.

S305: Determine whether the count of the counter of the server reaches a preset quantity m.

If the count of the counter of the server reaches the preset quantity m, the server performs step S306. Otherwise, the server performs step S301.

The preset threshold m is an integer greater than 1.

S306: The server trains the training sample set by using a reinforcement learning algorithm, to obtain a ranking model.

The server resets the counter of the server.

Specifically, that the server trains the training sample set by using a reinforcement learning algorithm, to obtain a ranking model may be considered as that the server performs training based on the training sample set and the reinforcement learning algorithm to solve a parameter θ' that maximizes a value of an expected function, and substitutes the parameter θ' for a parameter θ in the ranking model, to obtain a new ranking model. The process may be considered as a process of solving θ.

Specifically, the process of solving θ is as follows.

First, if a search word-document pair $(q, d_i)$ is replaced by a characteristic variable $x_i$, the set $(d_1, d_2, \ldots, d_M)$ may be replaced by a characteristic variable set $s=(x_1, \ldots, x_n)$, the training sample set $$\begin{pmatrix} q^{(1)}, d_1^{(1)}, \ldots d_M^{(1)}, \sigma^{(1)}, r^{(1)} \\ \vdots \\ q^{(m)}, d_1^{(m)}, \ldots d_M^{(m)}, \sigma^{(m)}, r^{(m)} \end{pmatrix}$$

may be replaced by $$\begin{pmatrix} x_1^{(1)}, \ldots x_M^{(1)}, \sigma^{(1)}, r^{(1)} \\ \vdots \\ x_1^{(m)}, \ldots x_M^{(m)}, \sigma^{(m)}, r^{(m)} \end{pmatrix},$$

and the ranking model is $f(q,d_i;\theta)=f(x_i;\theta)$.

Second, θ is solved by using the expected function, where θ maximizes the value of the expected function. The expected function is $$\max_\theta R(\theta),$$

where $R(\theta)=\Sigma_{i=1}^{m} p(\sigma^{(i)}|s^{(i)};\theta)r^{(i)}$, $\sigma^{(i)}$ is a target document ranking list corresponding to a historical search word q in an $i^{th}$ sample of the training sample set, $s^{(i)}$ is M documents corresponding to the historical search word q in the $i^{th}$ sample of the training sample set, and $r^{(i)}$ is a ranking effect evaluation value in the $i^{th}$ sample of the training sample set.

A function $p(\sigma^{(i)}|s^{(i)};\theta)$ is a probability of obtaining the document ranking list $\sigma^{(i)}$ based on the M documents $s^{(i)}$, and $\theta$ is a parameter that maximizes a value of the function $p(\sigma^{(i)}|s^{(i)};\theta)$.

Specifically, a likelihood function $$p(\sigma \mid s; \theta) = p(\sigma \mid x_1, \ldots, x_M) = \prod_{r^{(i)} < r^{(j)}} p_{ij},$$

where $r^{(i)} < r^{(j)}$ indicates that a ranking effect of a $j^{th}$ target document ranking list in the training sample set is better than a ranking effect of an $i^{th}$ target document ranking list in the training sample set, and $$p_{ij} = \frac{1}{1 + \exp(-(f(x_i; \theta) - f(x_j; \theta)))}.$$

Finally, a gradient ascent method is used to solve $\theta$ that maximizes the value of the function $$\max_{\theta} R(\theta),$$

and $\theta = \theta + \alpha \nabla_\theta R(\theta)$.

It can be learned according to the reinforcement learning algorithm that $\nabla_\theta R(\theta) = E[\nabla_\theta \ln p(\sigma|s;\theta)r] = \sum_{i=1}^m \ln p(\sigma^{(i)}|s^{(i)};\theta)r^{(i)}$.

For a gradient of a log-likelihood function, $$\nabla_\theta \ln p(\sigma \mid s; \theta) = \sum_{i=1, j=1}^m \left( \frac{1 - S_{ij}}{2} - \frac{1}{1 + \exp(f(x_i; \theta) - f(x_j; \theta))} \right)$$

$$\left( \frac{\partial f(x_i; \theta)}{\partial \theta} - \frac{\partial f(x_j; \theta)}{\partial \theta} \right).$$

$$S_{ij} = \begin{cases} +1, & \text{if } r^{(i)} < r^{(j)} \\ 0, & \text{if } r^{(i)} = r^{(j)} \\ -1, & \text{if } r^{(i)} > r^{(j)}, \end{cases}$$

where $r^{(i)} < r^{(j)}$ indicates that a ranking effect of a $j^{th}$ target document ranking list in the training sample set is better than a ranking effect of an $i^{th}$ target document ranking list in the training sample set; $r^{(i)} = r^{(j)}$ indicates that a ranking effect of a $j^{th}$ target document ranking list in the training sample set is the same as a ranking effect of an $i^{th}$ target document ranking list in the training sample set; and $r^{(i)} > r^{(j)}$ indicates that a ranking effect of an $i^{th}$ target document ranking list is better than a ranking effect of a $j^{th}$ target document ranking list in the training sample set.

It should be noted herein that the gradient ascent method is common general knowledge for a person skilled in the art, and therefore a process of using the gradient ascent method to solve $\theta$ that maximizes the value of the function $$\max_{\theta} R(\theta)$$

is not described herein.

Further, after performing step S305, the server proceeds to perform step S301, and the counter of the server starts counting.

Figure 4:
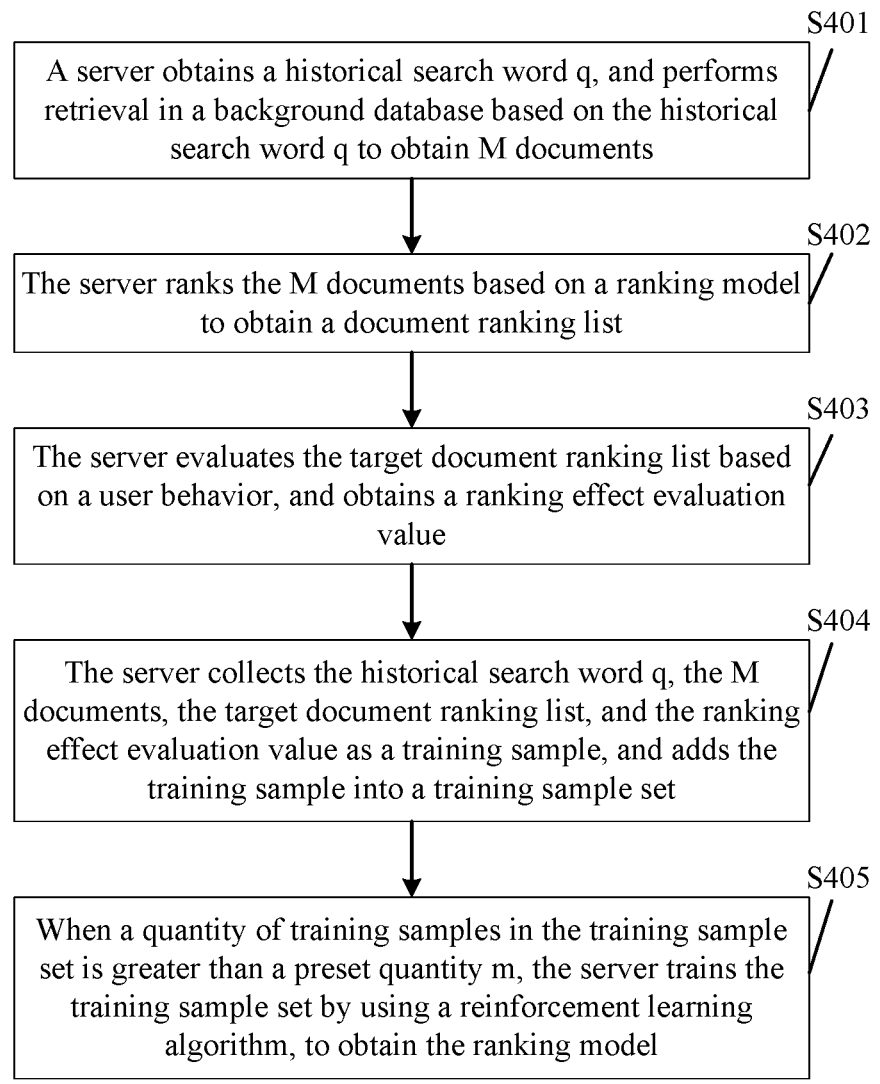
FIG. 4 is a schematic flowchart of a learning-to-rank method based on reinforcement learning according to an embodiment of the present disclosure.

FIG. 4 is a schematic flowchart of another learning-to-rank method based on reinforcement learning according to an embodiment of the present disclosure. As shown in FIG. 4, the another learning-to-rank method based on reinforcement learning according to this embodiment of the present disclosure includes the following steps.

S401: A server obtains a historical search word q, and performs retrieval in a background database based on the historical search word q to obtain M documents.

Optionally, the historical search word may be entered by a user, or may be automatically obtained by the server.

The historical search word q is included in a title or content of any of the M documents. The M documents may be represented by a set $(d_1, d_2, \ldots, d_M)$.

S402: The server ranks the M documents based on a ranking model to obtain a document ranking list.

Specifically, the server scores a correlation between each of the M documents and the historical search word q based on the ranking model to obtain a scoring result.

The correlation between each of the M documents and the historical search word q includes a quantity of occurrences of the historical search word q in a title or content of each of the M documents.

The server ranks the M documents in ascending order or descending order of the scoring results to obtain the target document ranking list.

The ranking model is a differentiable function including a parameter, and may be represented by $f(q,d;\theta)$, where q is the historical search word, d is a document obtained based on the historical search word q, and $\theta$ is the parameter.

Scoring results obtained by the server by scoring occurrence frequency of the historical search word in all of the M documents based on the ranking model $f(q,d;\theta)$ may be represented by a set $(d_1', d_2', \ldots, d_M')$, and the target document ranking list obtained by the server by ranking the M documents in ascending order or descending order of the scoring results may be represented by a set $(y_1, y_2, \ldots, y_M)$.

Further, the foregoing process can be represented by $\sigma=(y_1, y_2, \ldots, y_M)=\text{sort}(d_1, d_2, \ldots, d_M)$. The sort function is a descending-order ranking model or an ascending-order ranking model.

S403: The server evaluates the target document ranking list based on a user behavior, and obtains a ranking effect evaluation value r.

That an evaluation system of the server evaluates the target document ranking list based on a user behavior is specifically performing evaluation based on a behavior of clicking the document ranking list by the user, and providing the ranking effect evaluation value r.

It should be noted herein that a larger ranking effect evaluation value r indicates a better ranking effect of the target document ranking list. The target document ranking list is displayed on a display interface of the server in a list form.

Specifically, after receiving the historical search word q entered by the user, the server obtains, from the background database, the M documents including the historical search word q, where the M documents are represented by $(d_1, d_2, \ldots, d_M)$. The server scores an $i^{th}$ document $d_1$ in the M documents based on the ranking model $f(q,d;\theta)$, and obtains a scoring result $y_i$, where $y_i=f(q,d_i;\theta)$. Then the server ranks the M documents in descending order or ascending order of the scoring result $y_i$, and obtains the target document ranking list.

After obtaining the target document ranking list, a search engine displays the target document ranking list in a page form. The server obtains a last click location k of the user in the page, where k∈{1, 2, ..., M}. The ranking effect evaluation value r is obtained by using an evaluation function r=1/k. If the last click location is in the front of the page, and k has a smaller value, it can be learned according to the evaluation function r=1/k that a ranking effect evaluation value r is larger, and further user satisfaction with a search result of the historical search word q is higher.

For example, after receiving the historical search word q entered by the user, the server obtains, through retrieval in the background database, 10 documents including the historical search word q, where the 10 documents are represented by $(d_1,d_2,d_3,d_4,d_5,d_6,d_7,d_8,d_9,d_{10})$. Then the server scores the 10 documents based on the ranking model $f(q,d;\theta)$, and ranks the n documents in descending order of scoring results to obtain a document ranking list, where the document ranking list is represented by $\sigma=\text{sort}(y_1,y_2,y_3,y_4,y_5,y_6,y_7,y_8,y_9,y_{10})$. The server displays the target document ranking list in a page form. If it is detected that the last click location of the user is in a fifth document, k=5, and it can be learned according to the evaluation function r=1/k that the ranking effect evaluation value is 0.2. If it is detected that the last click location of the user is in a second document, k=2, and it can be learned according to the evaluation function r=1/k that the ranking effect evaluation value is 0.5. If it is detected that the user performs no click operation, k=100, and it can be learned according to the evaluation function r=1/k that the ranking effect evaluation value is 0.01. It can be learned that a larger ranking effect evaluation value indicates higher user satisfaction with the search result of the historical search word q.

S404: The server collects the historical search word q, the M documents, the target document ranking list, and the ranking effect evaluation value as a training sample, and adds the training sample into a training sample set.

Specifically, the training sample may be represented by $(q, d_1, \ldots, d_M, \sigma, r)$, where q is the historical search word, $d_1, d_2, \ldots,$ and $d_M$ are the M documents, $\sigma$ is the target document ranking list $(y_1, y_2, \ldots, y_M)$, and r is the ranking effect evaluation value.

Further, when a quantity of training samples in the training sample set reaches a preset quantity m, the server performs step S405. The training sample set including m training samples may be represented by a set $$\begin{pmatrix} q^{(1)}, d_1^{(1)}, \ldots, d_M^{(1)}, \sigma^{(1)}, r^{(1)} \\ \vdots \\ q^{(m)}, d_1^{(m)}, \ldots, d_M^{(m)}, \sigma^{(m)}, r^{(m)} \end{pmatrix}.$$

Optionally, m is an integer greater than or equal to 1, and m may be 1, 2, 3, 5, 8, or another value.

S405: When a quantity of training samples in the training sample set is greater than a preset quantity m, the server trains the training sample set by using a reinforcement learning algorithm, to obtain the ranking model.

Specifically, that the server trains the training sample set by using a reinforcement learning algorithm, to obtain the ranking model may be considered as that the server performs training based on the training sample set and the reinforcement learning algorithm to solve a parameter $\theta'$ that maximizes a value of an expected function, and substitutes the parameter $\theta'$ for the parameter $\theta$ in the ranking model, to obtain a new ranking model. The process may be considered as a process of solving $\theta$.

Specifically, the process of solving $\theta$ is as follows.

First, if a search word-document pair $(q,d_i)$ is replaced by a characteristic variable $x_i$, the set $(d_1, d_2, \ldots, d_M)$ may be replaced by a characteristic variable set $s=(x_1, \ldots, x_M)$, the training sample set $$\begin{pmatrix} q^{(1)}, d_1^{(1)}, \ldots, d_M^{(1)}, \sigma^{(1)}, r^{(1)} \\ \vdots \\ q^{(m)}, d_1^{(m)}, \ldots, d_M^{(m)}, \sigma^{(m)}, r^{(m)} \end{pmatrix}$$

may be replaced by $$\begin{pmatrix} x_1^{(1)}, \ldots, x_M^{(1)}, \sigma^{(1)}, r^{(1)} \\ \vdots \\ x_1^{(m)}, \ldots, x_M^{(m)}, \sigma^{(m)}, r^{(m)} \end{pmatrix},$$

and the ranking model is $f(q,d_i;\theta)=f(x_i;\theta)$.

Second, $\theta$ is solved by using the expected function, where $\theta$ maximizes the value of the expected function. The expected function is $$\max_\theta R(\theta),$$

where $R(\theta)=\sum_{i=1}^{m} p(\sigma^{(i)}|s^{(i)};\theta)r^{(i)}$, $\sigma^{(i)}$ is a target document ranking list corresponding to a historical search word q in an $i^{th}$ sample of the training sample set, $s^{(i)}$ is M documents corresponding to the historical search word q in the $i^{th}$ sample of the training sample set, and $r^{(i)}$ is a ranking effect evaluation value in the $i^{th}$ sample of the training sample set.

A function $p(\sigma^{(i)}|s^{(i)};\theta)$ is a probability of obtaining the document ranking list $\sigma^{(i)}$ based on the M documents $s^{(i)}$.

Specifically, a likelihood function $$p(\sigma|s;\theta) = p(\sigma|x_1, \ldots, x_n) = \prod_{r^{(i)}<r^{(j)}} p_{ij},$$

where $r^{(i)}<r^{(j)}$ indicates that a ranking effect of a $j^{th}$ target document ranking list in the training sample set is better than a ranking result of an $i^{th}$ target document ranking list in the training sample set, and $$p_{ij} = \frac{1}{1+\exp(-(f(x_i;\theta)-f(x_j;\theta)))}.$$

Finally, a gradient ascent method is used to solve $\theta$ that maximizes the value of the function $$\max_\theta R(\theta),$$

and $\theta=\theta+\alpha\nabla_\theta R(\theta)$.

It can be learned according to the reinforcement learning algorithm that $\nabla_\theta R(\theta)=E[\nabla_\theta \ln p(\sigma|s;\theta)r]=\sum_{i=1}^{m} \ln p(\sigma^{(i)}|s^{(i)};\theta)r^{(i)}$.

For a gradient of a log-likelihood function, $$\nabla_\theta \ln p(\sigma \mid s; \theta) = \sum_{i=1,j=1}^{m} \left( \frac{1-S_{ij}}{2} - \frac{1}{1+\exp(f(x_i;\theta)-f(x_j;\theta))} \right)$$

$$\left( \frac{\partial f(x_i;\theta)}{\partial \theta} - \frac{\partial f(x_j;\theta)}{\partial \theta} \right).$$

$$S_{ij} = \begin{cases} +1, & \text{if } r^{(i)} < r^{(j)} \\ 0, & \text{if } r^{(i)} = r^{(j)} \\ -1, & \text{if } r^{(i)} > r^{(j)}, \end{cases}$$

where $r^{(i)} < r^{(j)}$ indicates that a ranking effect of a $j^{th}$ target document ranking list in the training sample set is better than a ranking effect of an $i^{th}$ target document ranking list in the training sample set; $r^{(i)} = r^{(j)}$ indicates that a ranking effect of a $j^{th}$ target document ranking list in the training sample set is the same as a ranking effect of an $i^{th}$ target document ranking list in the training sample set; and $r^{(i)} > r^{(j)}$ indicates that a ranking effect of an $i^{th}$ target document ranking list is better than a ranking effect of a $j^{th}$ target document ranking list in the training sample set.

It should be noted herein that the gradient ascent method is common general knowledge for a person skilled in the art, and therefore a process of using the gradient ascent method to solve θ that maximizes the value of the function $$\max_\theta R(\theta)$$

is not described herein.

It should be noted that for a specific implementation process of each step of the method shown in FIG. 4, refer to a specific implementation process of the foregoing method, and details are not described herein again.

Figure 5:
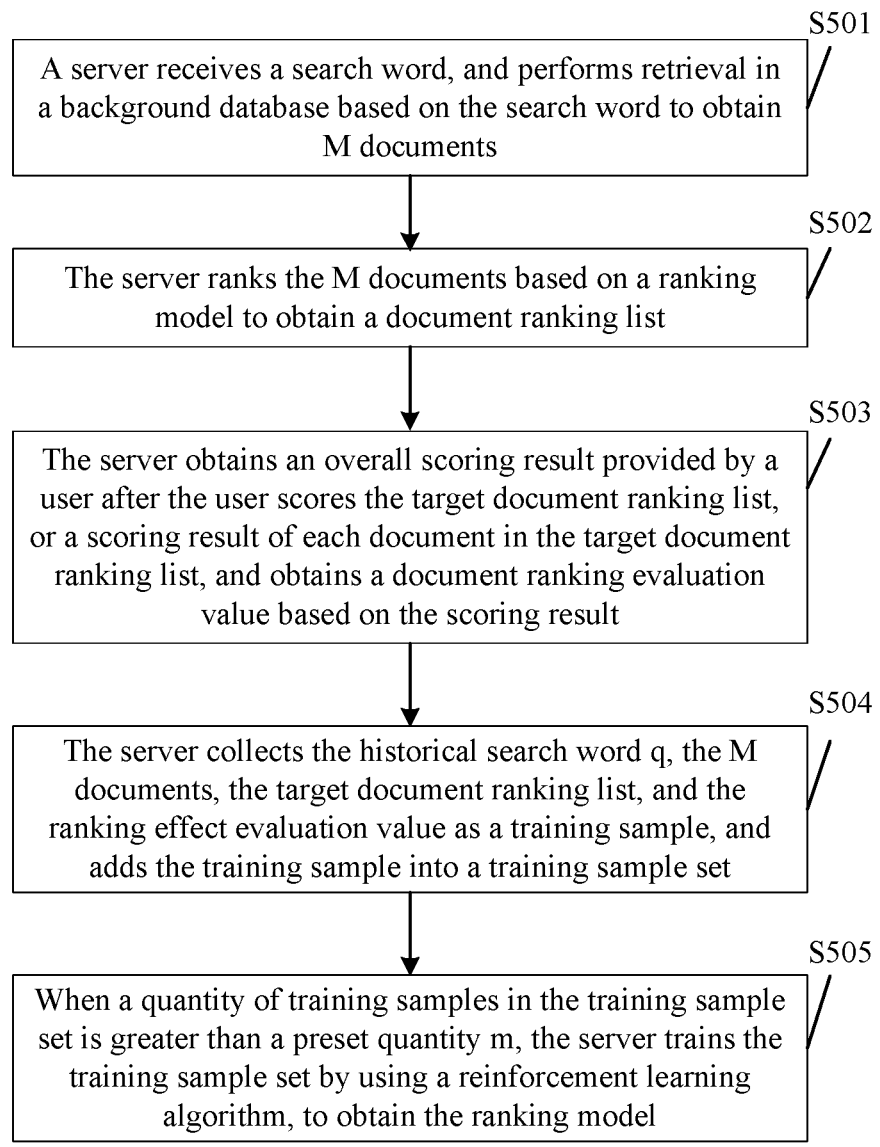
FIG. 5 is a schematic flowchart of a learning-to-rank method based on reinforcement learning according to an embodiment of the present disclosure.

FIG. 5 is a schematic flowchart of another learning-to-rank method based on reinforcement learning according to an embodiment of the present disclosure. As shown in FIG. 5, the another learning-to-rank method based on reinforcement learning according to this embodiment of the present disclosure includes the following steps.

S501: A server obtains a historical search word q, and performs retrieval in a background database based on the historical search word q to obtain M documents.

Optionally, the historical search word may be entered by a user, or may be automatically obtained by the server.

The M documents may be represented by a set $(d_1, d_2, \ldots, d_M)$, and the historical search word q is included in a title or content of any of the M documents.

S502: The server ranks the M documents based on a ranking model to obtain a document ranking list.

Specifically, the server scores a correlation between each of the M documents and the historical search word q based on the ranking model to obtain a scoring result.

The correlation between each of the M documents and the historical search word q includes a quantity of occurrences of the historical search word q in a title or content of each of the M documents.

The server ranks the M documents in ascending order or descending order of the scoring results to obtain the document ranking list.

The ranking model is a differentiable function including a parameter, and may be represented by $f(q,d;\theta)$, where q is the historical search word, d is a document obtained based on the historical search word q, and θ is the parameter.

Scoring results obtained by the server by scoring occurrence frequency of the historical search word in all of the M documents based on the ranking model $f(q,d;\theta)$ may be represented by a set $(d'_1, d'_2, \ldots, d'_M)$ and the target document ranking list obtained by the server by ranking the M documents in ascending order or descending order of the scoring results may be represented by a set $(y_1, y_2, \ldots, y_M)$.

Further, the foregoing process can be represented by $\sigma = (y_1, y_2, \ldots, y_M) = \text{sort}(d_1, d_2, \ldots, d_M)$. The sort function is a descending-order ranking model or an ascending-order ranking model.

S503: The server obtains an overall scoring result provided by a user after the user scores the target document ranking list, or a scoring result of each document in the target document ranking list, and obtains a document ranking evaluation value based on the scoring result.

It should be noted herein that a larger ranking effect evaluation value r indicates a better ranking effect of the target document ranking list.

The server obtains the scoring result provided by the user after the user scores each document in the target document ranking list, and obtains the document ranking evaluation value r based on the scoring result.

Specifically, the user scores a correlation between each document in the target document ranking list $(y_1, y_2, \ldots, y_M)$ and the historical search word q and provides a scoring result. The scoring results may be represented by a set $(g_1, g_2, \ldots, g_M)$. The scoring result $g_i$ is an $i^{th}$ value in the set $(g_1, g_2, \ldots, g_M)$, and $g_i \in (0,1,2,3)$.

Optionally, $g_i$ may be a value in other ranges, for example, (0,1, 2, 3, 4, 5) or (0,1, 2, 3, 4, 5, 6, 7).

Further, the server calculates the ranking effect evaluation value r according to a preset formula. The preset formula may be DCG@K and the ranking effect evaluation value $$r = DCG@K = \sum_{i=1}^{K} \frac{2^{g_{\sigma^-(i)}} - 1}{\log_2(i+1)},$$

where $g_{\sigma^-(i)}$ may be understood as the $i^{th}$ value in the set $(g_1, g_2, \ldots, g_M)$, namely, $g_i$.

It should be noted herein that a full English name of DCG is Discounted Cumulative Gain, and the DCG is an indicator for measuring a server algorithm.

DCG@K means that a DCG is calculated based on the first K results in search results, and a value of K is related to a quantity of search results focused on by the user.

For example, assuming that the server is a web page server, and the user usually focuses on ranking quality of the first 10 (in a first page) documents, K=10. Alternatively, assuming that the server is a question-answering system, and the user usually focuses on quality of a first document, K=1.

Optionally, the server obtains the overall scoring result provided by the user after the user scores the target document ranking list, and obtains the document ranking evaluation value based on the scoring result.

For example, if overall ranking quality of the ranking result is classified into five levels, $r \in (-2, -1, 0, 1, 2)$, where 2 represents perfect overall ranking quality, 1 represents relatively high overall ranking quality, 0 represents ordinary overall ranking quality, 1 represents relatively low overall ranking quality, and 2 represents quite low overall ranking quality. The ranking quality of the ranking result is scored manually based on the five levels.

S504: The server uses the historical search word, the M documents, the target document ranking list, and the ranking effect evaluation value as a training sample, and adds the training sample into a training sample set.

Specifically, the training sample may be represented by (q, $d_1, \ldots d_M$, σ, r), where q is the historical search word, $d_1, d_2, \ldots,$ and $d_M$ are the M documents, σ is the target document ranking list $(y_1, y_2, \ldots, y_M)$, and r is the ranking effect evaluation value.

Further, when a quantity of training samples in the training sample set reaches m, the server performs step S505. The training sample set including m training samples may be represented by a set $$\begin{pmatrix} q^{(1)}, d_1^{(1)}, \ldots, d_M^{(1)}, \sigma^{(1)}, r^{(1)} \\ \vdots \\ q^{(m)}, d_1^{(m)}, \ldots, d_M^{(m)}, \sigma^{(m)}, r^{(m)} \end{pmatrix}.$$

Herein, m is an integer greater than or equal to 1. Optionally, m may be 1, 2, 3, 5, 8, or another value.

S505: When a quantity of training samples in the training sample set is greater than a preset quantity m, the server trains the training sample set by using a reinforcement learning algorithm, to obtain the ranking model.

Specifically, that the server trains the training sample set by using a reinforcement learning algorithm, to obtain the ranking model may be considered as that the server performs training based on the training sample set and the reinforcement learning algorithm to solve a parameter θ' that maximizes a value of an expected function, and substitutes the parameter θ' for the parameter θ' in the ranking model, to obtain a new ranking model. The process may be considered as a process of solving θ.

Specifically, the process of solving θ is as follows.

First, if a search word-document pair (q, $d_i$) is replaced by a characteristic variable $x_i$, the set ($d_1, d_2, \ldots, d_M$) may be replaced by a characteristic variable set s=($x_1, \ldots, x_M$), the training sample set $$\begin{pmatrix} q^{(1)}, d_1^{(1)}, \ldots d_M^{(1)}, \sigma^{(1)}, r^{(1)} \\ \vdots \\ q^{(m)}, d_1^{(m)}, \ldots d_M^{(m)}, \sigma^{(m)}, r^{(m)} \end{pmatrix}$$

may be replaced by $$\begin{pmatrix} x_1^{(1)}, \ldots x_M^{(1)}, \sigma^{(1)}, r^{(1)} \\ \vdots \\ x_1^{(m)}, \ldots x_M^{(m)}, \sigma^{(m)}, r^{(m)} \end{pmatrix},$$

and the ranking model is f(q,$d_i$;θ)=f($x_i$;θ).

Second, θ is solved by using the expected function, where θ maximizes the value of the expected function. The expected function is $$\max_{\theta} R(\theta),$$

where $R(\theta)=\Sigma_{i=1}^{m} p(\sigma^{(i)}|s^{(i)};\theta)r^{(i)}$, $\sigma^{(i)}$ is a document ranking list corresponding to a historical search word q in an $i^{th}$ sample of the training sample set, $s^{(i)}$ is M documents corresponding to the historical search word q in the $i^{th}$ sample of the training sample set, and $r^{(i)}$ is a ranking effect evaluation value in the $i^{th}$ sample of the training sample set.

A function $p(\sigma^{(i)}|s^{(i)};\theta)$ is a probability of obtaining the document ranking list $\sigma^{(i)}$ based on the M documents $s^{(i)}$.

Specifically, a likelihood function $$p(\sigma|s;\theta) = p(\sigma|x_1, \ldots, x_M) = \prod_{r^{(i)} < r^{(j)}} p_{ij},$$

where $r^{(i)} < r^{(j)}$ indicates that a ranking effect of a $j^{th}$ target document ranking list in the training sample set is better than a ranking effect of an $i^{th}$ target document ranking list in the training sample set, and $$p_{ij} = \frac{1}{1 + \exp(-(f(x_i;\theta) - f(x_j;\theta)))}.$$

Finally, a gradient ascent method is used to solve θ that maximizes the value of the function $$\max_{\theta} R(\theta),$$

and θ=θ+α$\nabla_\theta$R(θ).

It can be learned according to the reinforcement learning algorithm that $\nabla_\theta R(\theta)=E[\nabla_\theta \ln p(\sigma|s;\theta)r]=\Sigma_{i=1}^{m} \ln p(\sigma^{(i)}|s^{(i)};\theta)r^{(i)}$.

For a gradient of a log-likelihood function, $$\nabla_\theta \ln p(\sigma|s;\theta) = \sum_{i=1,j=1}^{m} \left( \frac{1-S_{ij}}{2} - \frac{1}{1+\exp(f(x_i;\theta)-f(x_j;\theta))} \right)$$

$$\left( \frac{\partial f(x_i;\theta)}{\partial \theta} - \frac{\partial f(x_j;\theta)}{\partial \theta} \right).$$

$$S_{ij} = \begin{cases} +1, & \text{if } r^{(i)} < r^{(j)} \\ 0, & \text{if } r^{(i)} = r^{(j)} \\ -1, & \text{if } r^{(i)} > r^{(j)}, \end{cases}$$

where $r^{(i)} < r^{(j)}$ indicates that a ranking effect of a $j^{th}$ target document ranking list in the training sample set is better than a ranking effect of an $i^{th}$ target document ranking list in the training sample set; $r^{(i)}=r^{(j)}$ indicates that a ranking effect of a $j^{th}$ target document ranking list in the training sample set is the same as a ranking effect of an $i^{th}$ target document ranking list in the training sample set; and $r^{(i)}>r^{(j)}$ indicates that a ranking effect of an $i^{th}$ target document ranking list is better than a ranking effect of a $j^{th}$ target document ranking list in the training sample set.

It should be noted herein that the gradient ascent method is common general knowledge for a person skilled in the art, and therefore a process of using the gradient ascent method to solve θ that maximizes the value of the function $$\max_{\theta} R(\theta)$$

is not described herein.

Figure 6:
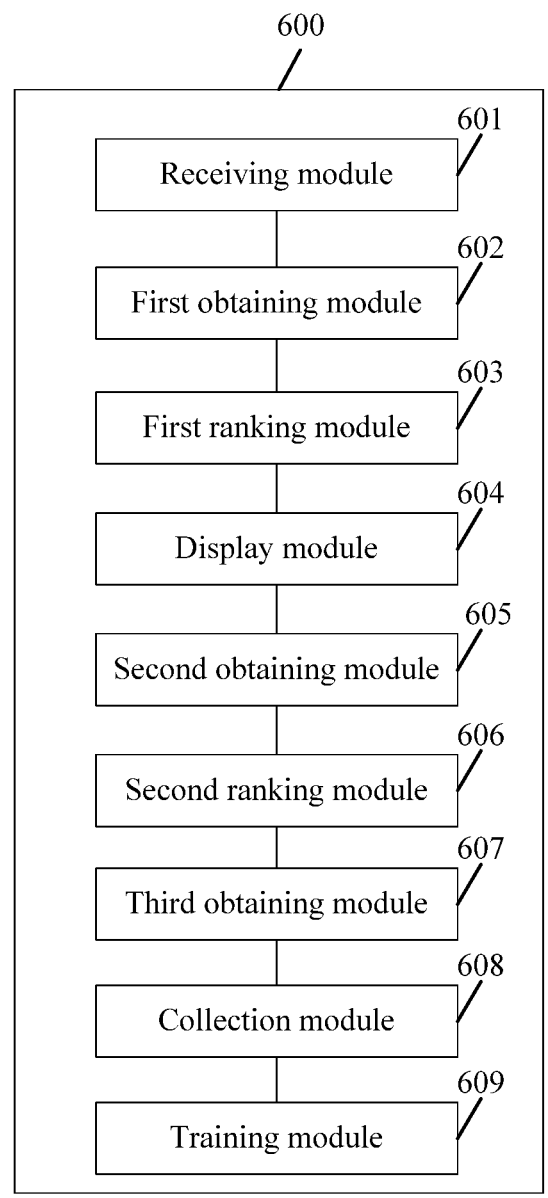
FIG. 6 is a schematic structural diagram of a server according to an embodiment of the present disclosure.
Figure 7:
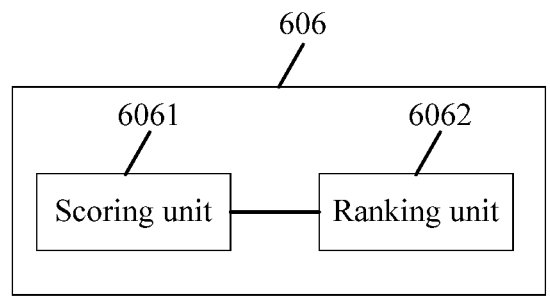
FIG. 7 is a schematic structural diagram of a part of a server according to an embodiment of the present disclosure.

An embodiment of the present disclosure further provides a server 600, as shown in FIG. 6, including a receiving module 601 configured to receive a search word entered by a user; a first obtaining module 602 configured to obtain N documents matching the search word, where N is a natural number; and a first ranking module 603 configured to rank the N documents by using a ranking model to obtain a document ranking list, where the ranking model is obtained through training based on a reinforcement learning algorithm, a historical search word, a historical document corresponding to the historical search word, and a document ranking list and a ranking effect evaluation value that are corresponding to the historical search word.

Optionally, before the first ranking module 603 ranks the N documents by using the first ranking model to obtain the document ranking list, the server 600 further includes a second obtaining module 605 configured to obtain the historical search word, and obtain M documents corresponding to the historical search word; and a second ranking module 606 configured to rank the M documents based on the ranking model to obtain a target document ranking list.

The second ranking model 606 includes a scoring unit 6061 configured to score a correlation between each of the M documents and the historical search word based on the ranking model to obtain a scoring result; and a second ranking unit 6062 configured to rank the M documents in ascending order or descending order of the scoring results to obtain the target document ranking list; and a third obtaining module 607 configured to obtain a ranking effect evaluation value of the target document ranking list.

Optionally, the third obtaining module 607 is specifically configured to evaluate a ranking effect of the target document ranking list based on a user behavior, and obtain the ranking effect evaluation value.

Optionally, the third obtaining module 607 is specifically configured to obtain a value provided by the user after the user evaluates a ranking effect of the target document ranking list, and use the value as the ranking effect evaluation value.

Optionally, the third obtaining module 607 is specifically configured to evaluate a ranking effect of the target document ranking list based on a result provided by the user after the user scores a correlation between each document in the target document ranking list and the historical search word, to obtain the ranking effect evaluation value.

A collection module 608 is configured to use the historical search word, the M documents, the target document ranking list, and the ranking effect evaluation value as a training sample, and add the training sample into a training sample set.

A training module 609 is configured to, when a quantity of training samples in the training sample set is greater than a preset quantity, train the training sample set by using the reinforcement learning algorithm, to obtain the ranking model.

A display module 604 is configured to display the document ranking list to the user.

It should be noted that the foregoing modules (the receiving module 601, the first obtaining module 602, the first ranking module 603, the display module 604, the second obtaining module 605, the second ranking module 606, the third obtaining module 607, the collection module 608, and the training module 609) are configured to perform related steps in the foregoing method.

In this embodiment, the server 600 is presented in a module form. Herein, the "module" may be an application-specific integrated circuit (application-specific integrated circuit, ASIC), a processor that executes one or more software or firmware programs and a memory, an integrated logical circuit, and/or another component that can provide the foregoing functions. In addition, the receiving module 601, the first obtaining module 602, the first ranking module 603, the display module 604, the second obtaining module 605, the second ranking module 606, the third obtaining module 607, the collection module 608, and the training module 609 may be implemented by using a processor 801 of a terminal device shown in FIG. 8.

Figure 8:
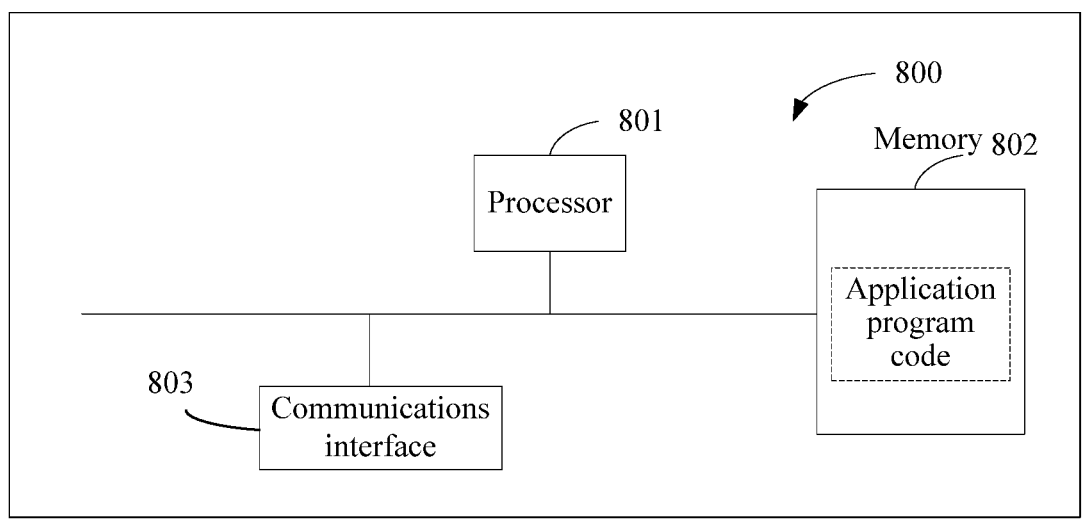
FIG. 8 is a schematic structural diagram of another server according to an embodiment of the present disclosure.

As shown in FIG. 8, a server 800 may be implemented as a structure shown in FIG. 8, and the server 800 includes at least one processor 801, at least one memory 802, and at least one communications interface 803. The processor 801, the memory 802, and the communications interface 803 are connected and communicate with each other by using a communication bus.

The processor 801 may be a general purpose central processing unit (CPU), a microprocessor, an application-specific integrated circuit (application-specific integrated circuit, ASIC), or one or more integrated circuits for controlling program execution of the foregoing solution.

The communications interface 803 is configured to communicate with another device or a communications network, such as an Ethernet, a radio access network (RAN), or a wireless local area network (WLAN).

The memory 802 may be a read-only memory (ROM), another type of static storage device that can store static information and an instruction, a random access memory (RAM), or another type of dynamic storage device that can store information and an instruction; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a BLUE-RAY disc, or the like), a magnetic disk storage medium or another magnetic storage device, or any other medium that can be configured to carry or store expected program code in a form of an instruction or a data structure and that can be accessed by a computer. This does not constitute a limitation herein. The memory may exist independently, and is connected to the processor by using the bus. Alternatively, the memory may be integrated with the processor.

The memory 802 is configured to store application program code for executing the foregoing solutions, and the processor 701 controls execution. The processor 801 is configured to execute the application program code stored in the memory 802.

The code stored in the memory 802 may be used to perform the learning-to-rank method based on reinforcement learning that is provided above and that is performed by a terminal device. For example, the server obtains a historical search word, and obtains M documents corresponding to the historical search word; the server ranks the M documents to obtain a target document ranking list; the server obtains a ranking effect evaluation value of the target document ranking list; the server uses the historical search word, the M documents, the target document ranking list, and the ranking effect evaluation value as a training sample, and adds the training sample into a training sample set; and when a quantity of training samples in the training sample set is greater than a preset quantity, the server trains the training sample set by using a reinforcement learning algorithm, to obtain a ranking model.

An embodiment of the present disclosure further provides a computer storage medium. The computer storage medium may store a program. When the program is executed, some or all steps of any learning-to-rank method based on reinforcement learning described in the foregoing method embodiments may be performed.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable memory. Based on such an understanding, the technical solutions may be implemented in the form of a software product. The computer software product is stored in a storage and includes several instructions for instructing a computer device (which may be a personal computer, a server, a network device, or the like) to perform all or a part of the steps of the methods described in the embodiments of the present disclosure. The foregoing storage includes any medium that can store program code, such as a universal serial bus (USB) flash drive, a ROM, a RAM, a removable hard disk, a magnetic disk, or an optical disc.

A person of ordinary skill in the art may understand that all or some of the steps of the methods in the embodiments may be implemented by a program instructing relevant hardware. The program may be stored in a computer readable memory. The memory may include a flash memory, a ROM, a RAM, a magnetic disk, and an optical disc.

The embodiments of the present disclosure are described in detail above. The principle and implementation of the present disclosure are described herein through specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A learning-to-rank method based on reinforcement learning and implemented by a server, wherein the learning-to-rank method comprises:
    receiving a search word from a user;
    obtaining N documents matching the search word, wherein N is a natural number;
    ranking the N documents using a ranking model to obtain a target document ranking list, wherein the ranking model is obtained through training based on a reinforcement learning algorithm, a historical search word, one or more historical documents corresponding to the historical search word, and a first historical document ranking list and a ranking effect evaluation value that correspond to the historical search word, wherein the reinforcement learning algorithm comprises a policy gradient algorithm, and wherein the policy gradient algorithm comprises adjusting a parameterized strategy function by a gradient descent algorithm to maximize an expected return; and
    displaying the target document ranking list to the user,
    wherein before ranking the N documents using the ranking model to obtain the target document ranking list, the learning-to-rank method further comprises:
        obtaining the historical search word and M documents corresponding to the historical search word;
        ranking the M documents to obtain a second historical document ranking list;
        obtaining a ranking effect evaluation value of the second historical document ranking list;
        using the historical search word, the M documents, the second historical document ranking list, and the ranking effect evaluation value as a training sample; and
        adding the training sample into a training sample set, wherein the training sample set is trained using the reinforcement learning algorithm to obtain the ranking model when a quantity of training samples in the training sample set is greater than a preset quantity.

2. The learning-to-rank method of claim 1, wherein ranking the M documents to obtain the second historical document ranking list comprises:
    scoring a correlation between each of the M documents and the historical search word;
    obtaining a scoring result; and
    ranking the M documents in ascending order or descending order of the scoring results to obtain the second historical document ranking list.

3. The learning-to-rank method of claim 1, wherein obtaining the ranking effect evaluation value of the second historical document ranking list comprises:
    evaluating a ranking effect of second historical target document ranking list based on a user behavior; and
    obtaining the ranking effect evaluation value based on the evaluation.

4. The learning-to-rank method of claim 1, wherein obtaining the ranking effect evaluation value of the second historical document ranking list further comprises using, as the ranking effect evaluation value, a value from the user that is based on an evaluation of a ranking effect of the second historical document ranking list.

5. The learning-to-rank method of claim 1, wherein obtaining the ranking effect evaluation value of the second historical document ranking list further comprises:
obtaining a scoring result from the user that is based on scoring a correlation between each document in the second historical document ranking list and the historical search word; and
evaluating a ranking effect of the second historical document ranking list based on the scoring result to obtain the ranking effect evaluation value.

6. The learning-to-rank method of claim 1, wherein each of the N documents comprises a title or content that comprises the search word.

7. A server, comprising:
a memory comprising instructions; and
a processor coupled to the memory and configured to execute the instructions to cause the server to:
receive a search word from a user;
obtain N documents matching the search word, wherein N is a natural number;
rank the N documents using a ranking model to obtain a target document ranking list, wherein the ranking model is obtained through training based on a reinforcement learning algorithm, a historical search word, a historical document corresponding to the historical search word, and a first historical document ranking list and a ranking effect evaluation value that correspond to the historical search word, wherein the reinforcement learning algorithm comprises a policy gradient algorithm, and wherein the policy gradient algorithm comprises adjusting a parameterized strategy function by a gradient descent algorithm to maximize an expected return; and
display the target document ranking list to the user,
wherein the processor is further configured to execute the instructions to cause the server to:
obtain the historical search word;
obtain M documents corresponding to the historical search word;
rank the M documents to obtain a second historical document ranking list;
obtain a ranking effect evaluation value of the second historical document ranking list;
use the historical search word, the M documents, the second historical document ranking list, and the ranking effect evaluation value as a training sample; and
add the training sample into a training sample set, wherein the training sample set is trained using the reinforcement learning algorithm to obtain the ranking model when a quantity of training samples in the training sample set is greater than a preset quantity.

8. The server of claim 7, wherein the processor is further configured to execute the instructions to cause the server to:
score a correlation between each of the M documents and the historical search word based on the ranking model to obtain a scoring result; and
rank the M documents in ascending order or descending order of the scoring results to obtain the second historical document ranking list.

9. The server of claim 7, wherein the processor is further configured to execute the instructions to cause the server to:
evaluate a ranking effect of the second historical document ranking list based on a user behavior; and
obtain the ranking effect evaluation value based on the evaluation.

10. The server of claim 7, wherein the processor is further configured to execute the instructions to cause the server to:
obtain a value from the user that is based on evaluating a ranking effect of the second historical document ranking list; and
use the value as the ranking effect evaluation value.

11. The server of claim 7, wherein the processor is further configured to execute the instructions to cause the server to:
obtain a scoring result from the user that is based on a correlation between each document in the second historical document ranking list and the historical search word; and
evaluate a ranking effect of the second historical document ranking list based on the scoring result to obtain the ranking effect evaluation value.

12. The server of claim 7, wherein each of the N documents comprises a title or content that comprises the search word.

13. A non-transitory computer readable storage medium comprising instructions that when executed by a computer processor cause a server to be configured to:
receive a search word from a user;
obtain N documents matching the search word, wherein N is a natural number;
rank the N documents using a ranking model to obtain a target document ranking list,
wherein the ranking model is obtained through training based on a reinforcement learning algorithm, a historical search word, one or more historical documents corresponding to the historical search word, and a first historical document ranking list and a ranking effect evaluation value that correspond to the historical search word, wherein the reinforcement learning algorithm comprises a policy gradient algorithm, and wherein the policy gradient algorithm comprises adjusting a parameterized strategy function by a gradient descent algorithm to maximize an expected return; and
display the target document ranking list to the user,
wherein the instructions further cause the computer to be configured to:
obtain the historical search word and M documents corresponding to the historical search word;
rank the M documents to obtain a second historical document ranking list;
obtain a ranking effect evaluation value of the second historical document ranking list;
use the historical search word, the M documents, the second historical document ranking list, and the ranking effect evaluation value as a training sample; and
add the training sample into a training sample set, wherein the training sample set is trained using the reinforcement learning algorithm to obtain the ranking model when a quantity of training samples in the training sample set is greater than a preset quantity.

14. The non-transitory computer readable storage medium of claim 13,
wherein the instructions further cause the server to be configured to:
score a correlation between each of the M documents and the historical search word;

obtain a scoring result; and rank the M documents in ascending order or descending order of the scoring results to obtain the second historical document ranking list.

15. The non-transitory computer readable storage medium of claim 13, wherein the instructions further cause the server to be configured to:

evaluate a ranking effect of the second historical document ranking list based on a user behavior; and obtain the ranking effect evaluation value based on the evaluation.

16. The non-transitory computer readable storage medium of claim 13, wherein the instructions further cause the server to be configured to obtain the ranking effect evaluation value of the second historical document ranking list using, as the ranking effect evaluation value, a value from the user that is based on an evaluation of a ranking effect of the second historical document ranking list.

17. The non-transitory computer readable storage medium of claim 13, wherein the instructions further cause the server to be configured to:

obtain a scoring result from the user that is based on scoring a correlation between each document in the second historical document ranking list and the historical search word; and evaluate a ranking effect of the second historical document ranking list based on the scoring result to obtain the ranking effect evaluation value.

18. The non-transitory computer readable storage medium of claim 13, wherein each of the N documents comprises a title or content that comprises the search word.

\* \* \* \* \*